HORIZONTAL SWEEP SYSTEM WITH AUTOMATIC RASTER SIZE REGULATION

Filed Dec. 29, 1967

Inventor
MEL E. BUECHEL

BY Mueller, Aichele & Rauner
ATTYS.

May 13, 1969 MEL E. BUECHEL 3,444,426

HORIZONTAL SWEEP SYSTEM WITH AUTOMATIC RASTER SIZE REGULATION

Filed Dec. 29, 1967 Sheet 2 of 2

Inventor
MEL E. BUECHEL

BY
Mueller, Aichele & Rauner
ATTYS.

United States Patent Office 3,444,426
Patented May 13, 1969

3,444,426
HORIZONTAL SWEEP SYSTEM WITH AUTOMATIC RASTER SIZE REGULATION

Mel E. Buechel, Chicago, Ill., assignor to Motorola, Inc., Franklin Park, Ill., a corporation of Illinois Filed Dec. 29, 1967, Ser. No. 694,462
Int. Cl. H01j 29/70
U.S. Cl. 315—27 17 Claims

ABSTRACT OF THE DISCLOSURE

The system operates to horizontally deflect the electron beam in a cathode ray tube and includes a semiconductor switch having its output electrodes coupled in series with a horizontal deflection winding and a voltage supply. A circuit coupled to the supply maintains the raster width constant with changes in the intensity and/or the vertical position of the electron beam.

*Background of the invention*

A standard television receiver includes sweep systems which provide horizontal and vertical sawtooth currents in associated deflection windings mounted on a cathode ray tube. The currents cause an electron beam in the cathode ray tube to be horizontally and vertically deflected to form a raster on the screen of the cathode ray tube. Flyback pulses generated in the horizontal sweep system are rectified to provide a high voltage or accelerating potential for the cathode ray tube. The width of the raster is proportional to the ratio, $I_D/E_A$ where $E_A$ represents the accelerating potential and, $I_D$ represents the peak-to-peak amplitude of the horizontal sawtooth current. The height of the raster is proportional to a similar ratio with $I_D$ representing the peak-to-peak amplitude of the vertical sawtooth current. The width ratio may change due to variations in intensity or in vertical position of the electron beam.

First, as to beam intensity variations. In present day receivers, the source impedance of the circuit supplying the accelerating potential is quite high and as a consequence, an increase in the beam intensity or beam current that accompanies an increase in the brightness of the picture, increases the voltage drop across the source impedance which in turn reduces the accelerating potential. In addition, such beam intensity correspondingly increases the current drawn by the horizontal sweep system from its DC voltage supply. The amplitude of the horizontal sawtooth current is proportional to the value of the DC voltage and, if the supply is unregulated, the DC voltage will drop with an increase in the beam intensity to reduce the peak-to-peak amplitude of the horizontal sawtooth current. Because the value of the accelerating potential and the amplitude of the horizontal sawtooth current change in the same direction for a given variation in beam intensity, there is, in accordance with the ratio given above, some tendency to cancel the changes, but the degree of compensation may not be complete and as a practical matter, the width of the raster may change as the beam intensity increases.

The vertical sweep system is independent of the accelerating potential developing circuit in the horizontal sweep system so that a change in beam intensity will not affect the peak-to-peak amplitude of the vertical sawtooth current. The reduced accelerating potential resulting from an increase in the beam intensity does, however, increase the height of the raster in accordance with the ratio given above. Thus, an increase in the beam intensity causes not only a change in raster width but an increase in raster height so that the aspect ratio, defined as the ratio of width-to-height, may change, causing an overall distortion of the image.

The effects arising from variations in the size and shape of the raster are particularly noticeable in color television receivers utilizing tri-gun cathode ray tubes which require substantially higher beam intensities and accelerating potentials than single gun black and white cathode ray tubes. As as results, some present day color television receivers utilize a regulator tube effectively coupled in shunt with the cathode ray tube. Regulators of this type provide a constant load to the accelerating potential providing circuit so that for low brightness conditions, where the beam intensity is low, the regulator tube draws almost all of the current, whereas the cathode ray tube draws most of the current during high brightness conditions to thereby maintain the accelerating potential constant. This is an inefficient mode of operation because a substantial amount of power is continually being dissipated. In addition, where the television receiver is completely transistorized except for the high voltage rectifier, it would be undesirable to sacrifice overall performance and reliability by adding a regulator tube. A transistorized regulator capable of withstanding the accelerating potential which may run as high as 27 kv. is not presently available.

The second cause for changes in the width of the raster arises from variations in the vertical position of the electron beam and is manifest as a distortion of the vertical sides of the raster. The screen in present-day color television cathode ray tubes is relatively flat so that there is a tendency for the sides of the raster to bend inwardly by an amount greatest at the vertical center and least at the top and bottom. This is referred to as pincushion distortion because the shape of inward bending is parabolic.

Circuits to correct this distortion change the extent of horizontal electron beam deflection by amounts depending on the vertical position of the beam by utilizing shaped parabolic signals derived from the vertical sweep system. One prior art system utilizes a saturable reactor coupled in series with the horizontal deflection winding. The impedance of the reactor is parabolically changed at the vertical deflection rate to provide decreasing extents of horizontal deflection towards the top and bottom of the raster to thereby straighten the sides. However, such a device is expensive and generally does not operate at an optimum efficiency. Other prior art systems control the bias on the horizontal output tube in the horizontal sweep system at a parabolic vertical rate. This type of operation is not satisfactory in a transistorized sweep system where it is difficult to accurate control raster width by changing the bias on the transistor.

*Summary of the invention*

It is, therefore, an object of this invention to provide a circuit for automatically changing the width of the raster in response to changes in the intensity and/or the vertical position of the electron beam in a cathode ray tube.

Another object is to provide an improved regulation circuit for a transistorized horizontal sweep system of a television receiver which regulates horizontal raster width over a wide range of cathode ray beam intensities while maintaining a constant aspect ratio.

Another object is to provide a regulation circuit for a horizontal sweep system which maintains the raster width constant with changes in the electron beam intensity without undue power dissipation in the system during low beam intensity conditions.

A further object is to provide an improved circuit in a transistorized horizontal sweep system for dynamically correcting the pincushion distortion on the vertical sides of the raster on a cathode ray tube viewing screen.

In brief, a horizontal sweep system incorporating the features of the invention is for use with a cathode ray tube having an electron beam dynamically varying in intensity and vertical position. The system includes an inductance winding for horizontally deflecting the electron beam and coupled in series with a voltage supply and the output electrodes of a semiconductor device. The system includes controllable resistance coupled to an input voltage and to the voltage supply. A control circuit is coupled to the controllable resistance and is responsive to the dynamic variations of the electron beam to vary the direct current voltage to maintain the extent of horizontal deflection substantially constant.

More specifically, the control circuit may include a device which senses the beam intensity and varies the voltage to change the amplitude of the horizontal deflection current by an amount to maintain the extent of horizontal deflection substantially constant within a selected range of beam intensities.

The control circuit may also include a sensing device coupled to the vertical sweep system to provide a correction signal the amplitude of which varies with the vertical position of the electron beam. The correction signal varies the voltage to change the amplitude of the horizontal deflection current by an amount to maintain the extent of horizontal deflection substantially constant in all vertical positions of the electron beam.

*Detailed description of the preferred embodiments*

Figures 1, 2:
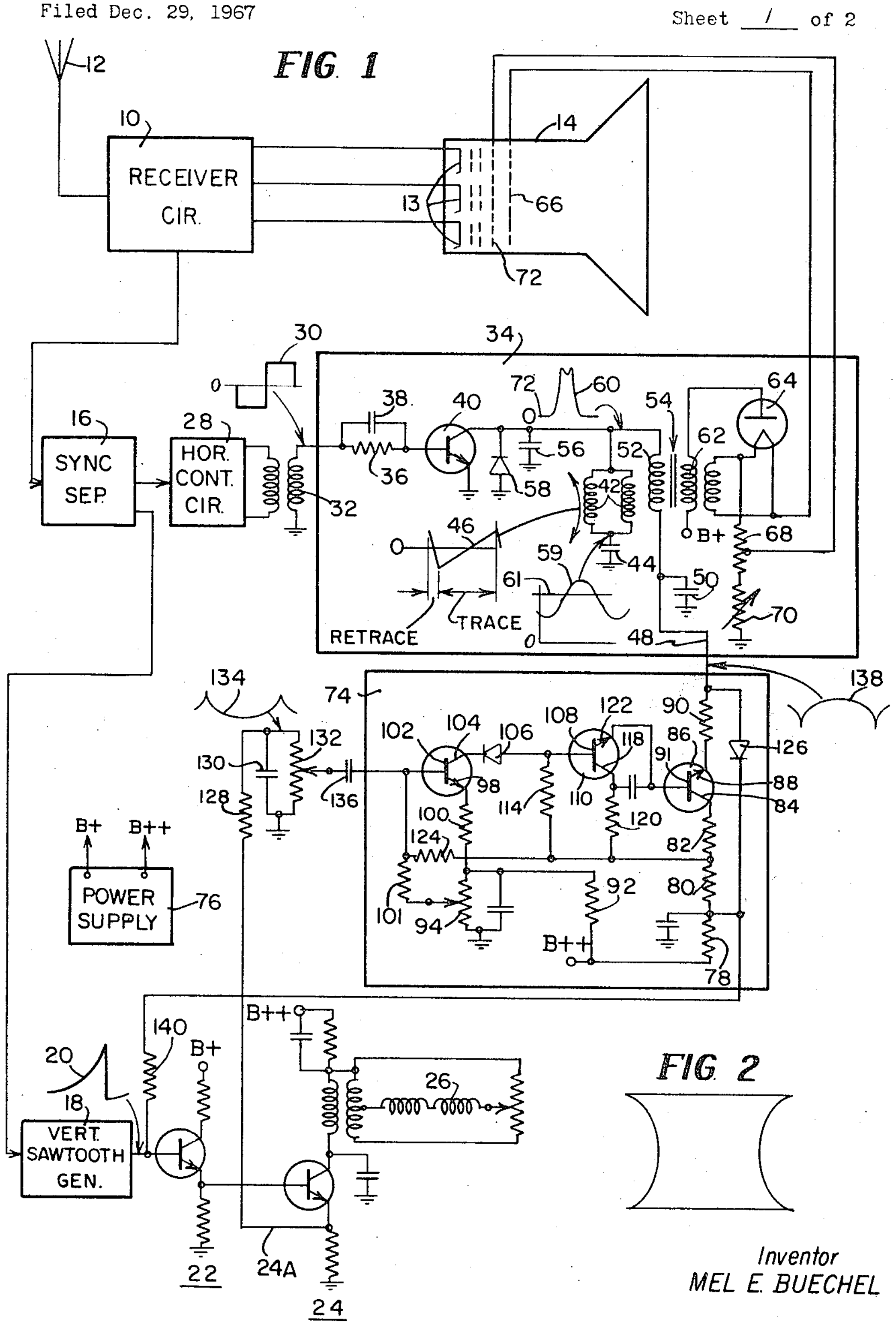
FIG. 1 illustrates a color television receiver partially in block and partially in schematic incorporating the automatic raster size regulation circuit according to the features of the invention.
FIG. 2 illustrates a raster which may appear on the screen of the cathode ray tube of FIG. 1.

Referring now to FIG. 1, the color television receiver therein shown includes a receiver circuit 10 to receive and convert incoming television signals appearing at antenna 12 to produce video information for the cathodes 13 of the multi-gun cathode ray tube 14. Vertical synchronizing pulses are separated from the video information in a synchronizing signal separator circuit 16. These pulses are applied to a generator 18 which develops a vertical sawtooth signal 20. After amplification in a pair of transistorized stages 22 and 24, a sawtooth deflection current is caused to flow through the vertical deflection windings 26 disposed on the cathode ray tube 14.

Horizontal synchronizing pulses derived from the synchronizing signal separator circuit 16 are applied to a horizontal control circuit 28 which is of standard construction and may include a phase detector, an oscillator and preamplifiers to produce a pulsating signal 30 across an inductance winding 32 for utilization by horizontal output circuit 34. The output circuit 34 includes a resistor 36 and a capacitor 38 coupled in parallel between winding 32 and the base of an NPN transistor 40. The other terminal of the winding 32 and the emitter of the transistor 40 are connected to a point of reference potential such as chassis ground. Resistor 36 and capacitor 38 form a self-bias network to provide a negative voltage for reverse biasing the emitter-base junction of transistor 40. Transistor 40 operates as a switch so that the negative portion of the pulsating signal 30 adds to the reverse bias to open the switch. The positive portion of the pulsating signal 30 overcomes the reverse bias to close the switch and effectively ground the collector of transistor 40.

The horizontal deflection windings 42 which are disposed on the cathode ray tube 14 are coupled in series with a capacitor 44 between the collector of transistor 40 and ground. By action to be explained presently, a sawtooth current 46 is caused to flow through the windings 42. The current has a trace interval during which the electron beams in the cathode ray tube 14 are slowly deflected from left to right across the screen of cathode ray tube 14 to depict the video information. Current 46 also has a retrace interval during which the electron beams are rapidly returned to the left hand side of the raster. A DC input voltage, appearing on the conductor 48 and bypassed by capacitor 50, is derived from a circuit to be explained hereinafter and is coupled through the primary winding 52 of a high voltage transformer 54 to the "top" of the deflection windings 42.

During the terminal part of the trace interval, the transistor 40 is forward biased by the positive portion of the pulsating signal 30 to close the "switch" and permit capacitor 44 to discharge through the deflection windings 42. The current through the windings linearly increases to form the terminal part of the trace portion of the sawtooth current 46. The appearance of the negative portion of the pulsating signal 30 from the horizontal control circuit 28 renders transistor 40 non-conductive to open the switch and cause the energy stored in the deflection windings 42 to discharge through a capacitor 56 in a half-wave oscillatory manner to form the retrace portion of the sawtooth current 46. The negative portion of the pulsating signal 30 has a sufficient duration to maintain transistor 40 non-conductive during the entire retrace interval and the initial part of the trace interval. Continued oscillation is prevented by a damper diode 58 which conducts current through the deflection windings 42 to form the initial part of the trace portion of the sawtooth current 46 and to recharge capacitor 44 to a value exceeding the DC input voltage on conductor 48. The alternate charging and discharging of capacitor 44 forms a parabola 59 having an average value 61 equal to the DC input voltage on conductor 48. The parabola, rather than a DC voltage, is desirable to linearize the deflection of the electron beams. Since the capacitor 44 provides the supply for deflection windings 42, it may be referred to as the voltage supply capacitor. When the positive portion of the pulsating signal 30 again appears, the forward bias condition is restored on the transistor 40 and the voltage supply capacitor 44 is again connected across the deflection windings 42 and a new cycle commences.

Flyback pulses 60 produced across the primary winding 52 during the retrace interval are stepped up to appear across the secondary winding 62 of transformer 54. The stepped up pulses are rectified by a high voltage rectifier 64 to produce a high voltage or accelerating potential for the final anode 66 of cathode ray tube 14. A focus bleeder comprised of resistor 68 and potentiometer 70 is coupled from the cathode of the rectifier 64 to ground. An intermediate point of the resistor 68 is coupled to the focus electrode 72 of the cathode ray tube 14 and the value of the focus voltage is varied by the setting of potentiometer 70.

The extent of horizontal deflection or the horizontal width of the raster depicted on the screen of cathode ray tube 14 is known to be proportional to the peak-to-peak amplitude of the sawtooth current 46 flowing through the deflection windings 42, and inversely proportional to the square root of the accelerating potential (the ratio of $I_D/E_A$). According to the formula $$i=\frac{1}{L}\int v\,di$$

where L is the inductance of windings 42, the amplitude of the sawtooth current is proportional to the voltage appearing across the deflection windings 42 which, as previously explained, is the voltage developed across the voltage supply capacitor 44. The average voltage across capacitor 44 is in turn substantially equal to the DC input voltage on conductor 48. Therefore, the peak-to-peak amplitude of the sawtooth current 46 is directly proportional to the DC input voltage appearing on conductor 48.

The intensity of the electron beams in the cathode ray tube 14, that is, the amount of current flowing between the cathodes 13 and the final anode 66, varies with brightness settings and with the content of the video information from receiver circuit 10. Since the source impedance of the accelerating potential is particularly high, on the order of 2.8 megohms or more, the accelerating potential on final anode 66 will decrease as the beam intensity increases due to the increased potential drop across the source impedance.

As the beam intensity increases, the horizontal output circuit 28 presents an increasing load to and requires more average current from the circuit which supplies the DC input voltage on conductor 48. Therefore, if the DC input voltage on conductor 48 is not regulated, it will vary with the beam intensity. In such case, if the beam current increases, the DC input voltage on conductor 48 will decrease to cause a proportional decrease in the amplitude of the peak-to-peak sawtooth current 46 flowing through the deflection windings 42. A reduction in the accelerating potential on final anode 66 of cathode ray tube 14 is caused by the increased potential drop across its source impedance. As stated previously, a decrease in the amplitude of the peak-to-peak sawtooth current 46 will cause a decrease in the width of the raster, and a decrease in the magnitude of the accelerating potential will cause an increase in the raster width. There is, therefore, some tendency for the changes in sawtooth current and accelerating potential to be compensating, but without some some sort of regulating circuitry, the compensation may be incomplete and in practice, either an overall decrease or increase in raster width would result depending on DC input voltage source impedance. This is particularly annoying to the viewer because the video information from the receiver circuit 10 is constantly changing in content to cause the width of the raster to constantly change.

In the past, this has been overcome in receivers using vacuum tubes by using a shunt-type voltage regulator tube which was effectively connected between the final anode 66 of the cathode ray tube 14 and ground. During low brightness conditions, the regulator tube drew almost all of the current from the horizontal output system 34, whereas during high brightness conditions, the cathode ray tube 14 drew most of the current. In this manner, a constant load was presented to the horizontal output system 34 so that the accelerating potential was maintained constant. This mode of operation, however, has the decided disadvantage of drawing a constant high power from the circuit which supplies the DC input voltage, on the order of 70 watts. Additionally, such a system is not adaptable for a transistorized receiver because a presently available transistor is not capable of withstanding the 27 kv. which will appear across it. The invention contemplated here uses a series regulator to provide power for the horizontal sweep system as needed so that during low brightness conditions, the total power disippation is low.

In order to overcome these changes in the width of the raster, the automatic raster width control circuit 74 is utilized as the circuit to provide the DC input voltage on conductor 48. A well regulated B++ voltage from a low source impedance power supply 76 is coupled through resistors 78, 80 and 82 to the collector 84 of a series regulator transistor 86. The emitter 88 of transistor 86 is coupled through a resistor 90 to conductor 48. The bias voltage on the base 91 of transistor 86 determines the resistance between the collector 84 and the emitter 88 which in turn determines the DC input voltage on conductor 48. The B++ voltage is also applied to a voltage divider comprising resistor 92 and potentiometer 94 to ground. The junction of resistor 92 and potentiometer 94 is coupled to the emitter 98 of a sensing transistor 96 through a resistor 100 to provide a fixed emitter reference voltage. The movable arm of potentiometer 94 is coupled through resistor 101 to base 102 of the sensing transistor 96 to provide a fixed base voltage and a quiescent bias on transistor 96. The collector 104 of transistor 96 is coupled to a diode 106 which protects transistor 96 against collector-base breakdown in the presence of an arc. The diode 106 is coupled to the base 108 of an emitter follower transistor 110. Bias for transistor 110 is provided by a resistor 114 coupled to base 108 from the junction of resistors 80 and 82. A supply voltage for the collector 118 is provided by resistor 120 from the junction of resistors 80 and 82. The emitter 122 of transistor 110 is coupled to the base 91 of the series regulator transistor 86 to provide a given resistance between the collector 84 and the emitter 88 to in turn provide a given DC input voltage on conductor 48. The capacitors in control circuit 74 bypass undesired oscillations and other AC signals at each of the points involved.

If the intensity of the electron beams in the cathode ray tube 14 increases, the horizontal output circuit 34 presents an increasing load to and requires more current from the control circuit 74. The increase in current is reflected as a reduction in the voltage appearing between resistors 80 and 82. This voltage is used as a control and is coupled through a resistor 124 to the base 102 of sensing transistor 96 to reduce its base-emitter bias and thereby decrease its collector-emitter conduction. This causes the voltage on the base 108 of emitter follower transistor 110 to increase which in turn increases the voltage on the base 91 of series regulator transistor 88 to lower the resistance between collector 84 and emitter 88 to provide the increased current requied by horizontal output circuit 34 but with a selected drop in the input DC voltage available on conductor 48. As previously explained, a given increase in the beam intensity gives rise to a proportional decrease in the peak-to-peak amplitude of the sawtooth current 46 in the deflection windings 42. Since the accelerating potential dropped due to the increase in beam intensity, the amount of decrease in the deflection current as provided by the decrease in the DC input voltage, should be sufficient to maintain the ratio, $I_D/E_A$, constant. For example, if the accelerating potential dropped to 90% of its original value, the DC input voltage should drop to a value such that the amplitude of the sawtooth current is reduced to $\sqrt{.90}$% of its original value. The lower the position of the movable arm, the faster the series regulator transistor 86 will tend to turn off and reduce the input voltage in response to a given change in the load (caused by a change in beam intensity) presented by the horizontal output system 34.

When an arc ocurs in the cathode ray tube 14 or in the high voltage rectifier 64, oscillations may appear on conductor 48, the positive peaks of which may cause reverse emitter-base breakdown of the series regulator transistor 88. The positive peaks are shunted around the transistor 88 by a diode 126 coupled from conductor 48 to the junction of resistors 78 and 80. An advantage of control circuit 74 is that it will limit the maximum current that can be drawn by the horizontal output circuit 34. In the presence of an abnormal condition such as a rectifier or cathode ray tube arc, the excessive current thereby developed will destroy transistor 40. However, such current would decrease the DC input voltage on conductor 48 to the point where the power dissipated in the transistor is substantially reduced.

The width of the raster also changes with the vertical position of the electron beams in the cathode ray tube 14. This may be seen more clearly by reference to FIG. 2 which illustrates a raster depicted on the screen of a cathode ray tube 14. It will be asumed that the television receiver includes sufficient vertical correction to provide the straight top and bottom shown. If there is no side correction, the vertical sides of the raster will bend parabolically inwardly, this characteristic being known as horizontal pincushion distortion. It may be seen that when the electron beams are at their upper and lower most vertical positions, the width of the raster is a maximum, and when the electron beams are at the central vertical position, the width is a minimum. The invention contemplates changing the accelerating potential and the deflection current by amounts depending on the vertical position of the electron beams in order to maintain the scan width constant over all vertical positions and thereby straighten the sides of the raster of FIG. 2.

In order to accomplish this, the sawtooth signal 20 generated by the vertical sawtooth generator 18 and amplified in stages 22 and 24 is coupled to a network comprising resistor 128 and a capacitor 130 and a potentiometer 132 coupled in parallel to generate a parabolic signal 134 recurring at the vertical sweep frequency. The signal 134 is coupled through capacitor 136 to the base 102 of transistor 96 where it is amplified and then coupled through emitter follower transistor 110 and applied to the series regulator transistor 88 to control the resistance between the collector 84 and the emitter 88. At the top and bottom of the raster where the amplitude of the parabolic signal 134 is a maximum, the conduction of transistor 88 is at a minimum to provide a minimum DC input voltage on conductor 48. At the center of the parabolic signal 134, the conduction of transistor 88 will be a maximum and the supply voltage on conductor 48 will also be a maximum. This operation produces a parabolic signal 138 on conductor 48 to continually change the DC input voltage to the horizontal output circuit 34 according to the vertical portion of the electron beams.

As previously explained, a decrease in the DC input voltage on conductor 48 in response to different vertical positions of the electron beam, will decrease the width of the raster. This is true because the potential drop across the source impedance of the accelerating potential, although changing with beam intensity, does not change with vertical position and therefore a given reduction in the DC input voltage will reduce the sawtooth curent 46 to decrease the width of the raster. Thus, at the top and bottom of the raster respectively corresponding to the minimum points of the parabolic signal 138, the current and accelerating potential are proportionately reduced to reduce the raster width. At the vertical center of the raster, the signal 138 has a maximum amplitude to increase the width. The increase and decrease in width is, in actuality, relative so that, for example, the width at the top and bottom of the raster may be maintained constant while the width at the vertical center is increased.

Therefore, the DC input voltage on conductor 48 is modulated in accordance with changes in the intensity and the vertical position of the beams in the cathode ray tube 14. It should be appreciated that either aspect of the invention could be used separately, that is, the DC input voltage may be modulated to correct for changes in the beam intensity or corrected for changes in the vertical position of the beams.

In the past, pincushion distortion has been minimized by coupling a saturable reactor in series with the horizontal deflection windings. The impedance of the reactor was parabolically changed at a vertical rate but such a device is expensive and inefficient. Other known systems control the bias on the vacuum tube in the horizontal output circuit. However, it is difficult to accurately control raster width by controlling the bias on a transistor. The circuit involved herein provides a novel method of accurately controlling width in a transistorized sweep system at maximum efficiency.

The height of the raster is proportional to the sawtooth current flowing through the vertical deflection windings 26 and is inversely proportional to the square root of the accelerating potential on the final anode 66 of cathode ray tube 14. Since the vertical sweep system is independent of the circuit which generates the accelerating potential, the amplitude of the peak-to-peak current in the deflection winding 26 is not affected by changes in the beam intensity. The decrease in accelerating potential due to the increase in beam intensity does, however, increase the raster height. If the raster width were to remain constant, in accordance with the invention explained thus far, the aspect ratio (raster width divided by raster height) would change to distort the reproduced image. In order to prevent this, a connection from the junction of resistors 78 and 80 in the control circuit 74 is coupled through a resistor 140 to the base of the transistor in stage 22 of the vertical sweep system. When the beam current increases, the voltage at the junction of resistors 78 and 80 decreases to either reduce the bias on the transistor in stage 22 thereby reducing its ability to amplify sawtooth signal 20 or if in the RC charging network simply reduce the amplitude of generated wave 20. The result is a decrease in the peak-to-peak current flowing through deflection winding 26 to reduce the raster height and thereby maintain a constant aspect ratio.

In a practical construction of the circuit of FIG. 1, constant raster size was maintained within a range of beam currents from 0 to 1.5 milliamps and with an accelerating potential of 27 kv. at 0 milliamps with the following component values.

| | | |
|---|---|---|
| Resistors: | | |
| **78** | ohms | 10 |
| **80** | do | 10 |
| **82** | do | 2.2 |
| **90** | do | 3.5 |
| **92** | do | 8,200 |
| Potentiometer **94** | do | 15,000–16,000 |
| Resistor: | | |
| **100** | do | 2,200 |
| **101** | do | 47,000 |
| **114** | do | 22,000 |
| **120** | do | 220 |
| **124** | do | 270,000 |
| **128** | do | 22,000 |
| Capacitor **130** | microfarads | 1 |
| Potentiometer **132** | ohms | 0–100,000 |
| Capacitor **136** | microfarads | .47 |
| B++ | volts | 100 |

With these values, the DC input voltage on conductor 48 was 80 volts when the beam current was 0, and the average current drawn by the horizontal output circuit 34 was .5 amp. At 1.5 milliamps of beam current, the input voltage was 72 volts and the average output current was 1 amp. At 80 volts, the parabolic signal 138 had an amplitude of 6 volts.

Figures 3, 4, 5:
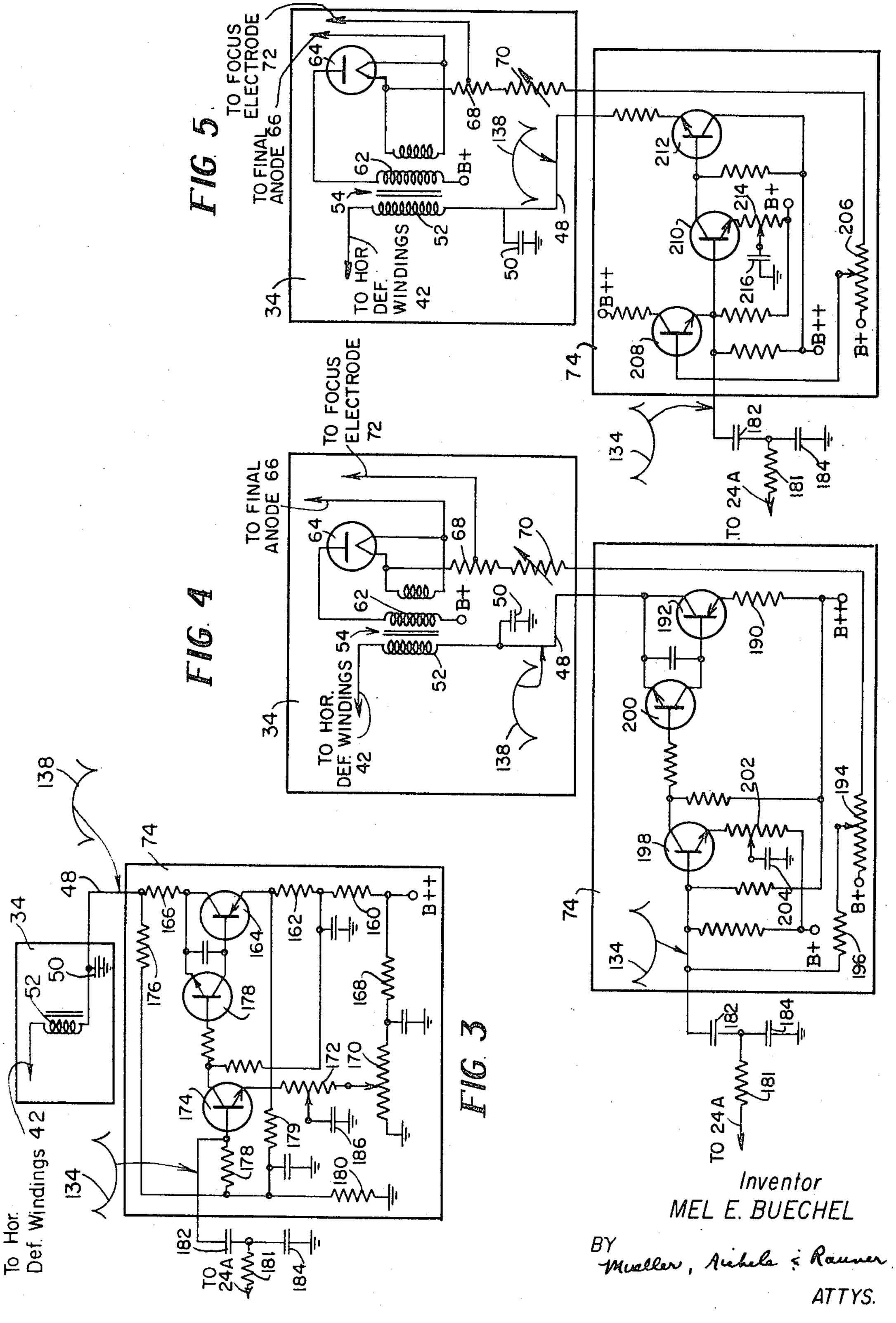
FIGS. 3, 4 and 5 illustrate further embodiments of the automatic raster size regulation circuit.

Another embodiment of the invention is shown in FIG. 3 where components corresponding to those of FIG. 1 are labeled with the same reference numerals. The B++ voltage is coupled through resistors 160 and 162 to the emitter of a PNP series regular transistor 164 and through resistor 166 to conductor 48 which supplies the DC input voltage for the horizontal output circuit 34. The B++ voltage is coupled through a resistor 168 and a potentiometer 170 to ground. The movable arm of potentiometer 170 provides a reference voltage through potentiometer 172 to the emitter of an NPN sensing transistor 174. The voltage on conductor 48 is utilized as a control and is coupled back through to the base of the sensing transistor 174 by resistors 176 and 178. The emitter of transistor 164 is coupled to the base of transistor 174 by a voltage divider comprising resistors 179 and 180 to provide an additional inphase control voltage. The control voltage is amplified in an NPN transistor 178 and applied to the base of the regulator transistor 164. If the beam intensity increases, the horizontal output circuit 34 presents an increasing load to and requires more current from the control circuit 74. This increase in current is reflected as a reduction in the control voltage on the base of transistor 174 to increase the conduction of transistor 178 which in turn increases the conductor of transistor 164 to provide the necessary increase in supply current for the horizontal output circuit 34 but with the required decrease in the DC input voltage on conductor 48. The rate of change of the DC input voltage with changes in the beam intensity is controlled by the setting of potentiometer 170.

The network for providing the parabolic signal 134 comprises a resistor 181 and series coupled capacitors 182 and 184 from the base of transistor 174 to ground. The movable arm of potentiometer 172 on the emitter of transistor 174 is coupled through a capacitor 186 to ground. By adjusting the position of the arm, the amplitude of the parabolic signal 138 appearing on conductor 48 may be varied.

Referring now to the embodiment of FIG. 4, where components corresponding to those of FIG. 1 are indicated with the same reference numerals, B++ is coupled through resistor 190 and series regulator transistor 192 to conductor 48. A potentiometer 194 is added in series with the focus bleeder comprising resistor 68 and potentiometer 70. The voltage on the movable arm of potentiometer 194 is utilized as a control and is coupled through resistor 196 to the base of a sensing transistor 198. As previously explained, an increase in the beam intensity causes a reduction in the accelerating potential. This is reflected as a decrease in the control voltage on the movable arm of potentiometer 194. The resulting decrease in conduction of the sensing transistor 198 will cause the conduction of an amplifier transistor 200 to increase. In turn, the conduction of regulator transistor 192 increases to provide the necessary increase in current but with the required decrease in the DC input voltage on conductor 48. The rate of change of the DC input voltage with changes in the beam intensity is controlled by the setting of potentiometer 194. The parabolic signal 134 is derived in a network similar to that of FIG. 3 and is amplified by transistors 198, 200 and 192. The amplitude of the parabolic signal 138 on conductor 48 is varied by adjusting the position of the movable arm of the potentiometer 202 on the emitter of transistor 198 which controls the degree of bypassing provided by capacitor 204.

Referring now to FIG. 5 which illustrates a further form of the invention, wherein components corresponding to those of FIG. 1 are labeled with the same reference numerals. A control voltage indicative of the accelerating potential is derived at the movable arm of a potentiometer 206 coupled in series with resistor 68 and potentiometer 70. Potentiometer 206 has a purpose similar to potentiometer 194 of FIG. 4. An increase in the beam intensity will result in a decrease in the control voltage to decrease the conduction of the transistor 208. This decreases the conduction of an amplifier transistor 210 to increase the conduction of a series regulator transistor 212 and provide the necessary increase in supply current but at a reduced DC input voltage. The parabolic signal 134 is supplied to the amplifier transistor 210 by way of a network similar to that of FIGS. 3 and 4. The amplitude of the parabolic signal 138 on conductor 48 is selected by adjusting the arm of a potentiometer 214 on the emitter of transistor 210 to control the amount of bypassing provided by the capacitor 216.

It should be noted that in FIGS. 1 and 3, it is the current flowing through the horizontal output circuit 34 which is being sensed to control the bias on the series regulator transistor, whereas in FIGS. 4 and 5 it is the amplitude of the accelerating potential which is being sensed. Each, however, is representative of the intensity of the electron beams in the cathode ray tube 14.

What has been described, therefore, is an improved automatic raster size control circuit for maintaining the width of a raster constant with changes in the intensity of the electron beams and/or changes in the vertical position of the beams. This is accomplished by controlling the supply voltage for the output semiconductor device in the horizontal sweep system.

I claim:

1. In a television receiver having a cathode ray tube with at least one electron beam therein dynamically varying in intensity and vertical position, a horizontal sweep system including in combination; semiconductor means having a pair of output electrodes, a horizontal deflection winding for horizontally deflecting the electron beam, regulated voltage supply means coupled in series with said output electrodes of said semiconductor means and said deflection winding, controllable resistance means coupled to said supply means for varying the average value of the voltage, and a control circuit coupled to said controllable resistance means and responsive to the dynamic variations of the electron beam for controlling the value of said resistance means to maintain the extent of horizontal deflection substantially constant.

2. The horizontal sweep system of claim 1 in which said controllable resistance means includes a semiconductor device having a pair of output electrodes coupled between said regulated voltage supply means and an unregulated direct current voltage, with said control circuit controlling the conduction of said semiconductor device.

3. The horizontal sweep system of claim 1 wherein said control circuit includes sensing means for providing a control voltage related to variations in the beam intensity for varying the value of said controllable resistance means by an amount to maintain the extent of horizontal deflection substantially constant within a selected range of beam intensity variations.

4. The horizontal sweep system of claim 3 wherein the current through said semiconductor means is related to the intensity of the electron beam, with said sensing means being coupled in series with said controllable resistance means to provide a control voltage related to the value of the current through said semiconductor means to control the value of said controllable resistance means.

5. The horizontal sweep system of claim 3 further including accelerating potential supply means for the cathode ray tube, with the magnitude of the accelerating potential being related to the intensity of the electron beam, and with said sensing means being coupled to said accelerating potential supply means to provide a control voltage representative of the magnitude of the accelerating potential for controlling said controllable resistance means.

6. The horizontal sweep system of claim 1 wherein said control circuit includes sensing means for providing a correction signal changing in magnitude with the vertical position of the electron beam for varying the value of said controllable resistance means by an amount to maintain the extent of horizontal deflection substantially constant in all vertical positions of the electron beam.

7. In a television receiver having a cathode ray tube with at least one electron beam generated therein varying in intensity, a horizontal deflection winding, a regulated voltage supply, a semiconductor switch coupled in series with the deflection winding and the voltage supply and periodically rendered conductive to couple the voltage across the deflection winding to produce a deflection current in the deflection winding proportional in amplitude to the voltage to horizontally deflect the electron beam, a circuit for supplying the cathode ray tube with an accelerating potential subject to decrease with an increase in the intensity of the electron beam, with the ratio of the deflection current to the square root of the accelerating potential determining the extent of horizontal deflection, a regulation circuit including in combination; controllable resistance means and an unregulated direct current voltage coupled in series to the regulated voltage supply, sensing means for providing a control voltage indicative of the intensity of the electron, beam, and circuit means coupling said sensing means to said resistance means to reduce the regulated voltage for an increase in the beam intensity to reduce the deflection current by an amount to maintain the said ratio substantially constant within a seleced range of beam intensity variations.

8. The regulation circuit of claim 7 in which said controllable resistance means includes a semiconductor device having a pair of output electrodes coupled between the unregulated direct current voltage and the regulated voltage supply, said semiconductor device having an input electrode coupled to said circuit means for controlling the conduction of said semiconductor device.

9. The regulation circuit of claim 7 wherein the circuit for supplying the cathode ray tube with an accelerating potential includes a transformer having primary and secondary windings and a rectifier device coupled from said secondary winding to the cathode ray tube, wherein said regulated voltage supply comprises capacitance means, means coupling said primary winding in series with said controllable resistance means and said capacitance means for controlling the average value of the regulated voltage appearing across said capacitance means.

10. The regulation circuit of claim 9 wherein the magnitude of the accelerating potential is related to the intensity of the electron beam, with said sensing means being coupled in series with the secondary winding of the transformer and the rectifier device to provide a control voltage representative of the magnitude of the accelerating potential.

11. The regulation circuit of claim 7 wherein the average current through the semiconductor switch is substantially proportional to the intensity of the electron beam, said sensing means comprising further resistance means coupled in series with said controllable resistance means to provide a control voltage substantially proportional to the current through the semiconductor switch.

12. The regulation circuit set forth in claim 11 wherein said circuit means includes an amplifier device for amplifying the control voltage coupled to said controllable resistance means and means coupling said sensing means to said amplifier device.

13. The regulation circuit of claim 7 wherein the television receiver has a vertical sweep system for vertically deflecting the electron beam, with the ratio of the vertical deflection current to the square root of the accelerating potential determining the extent of vertical deflection and subject to change with the intensity of the electron beam, the regulation circuit including means coupling said sensing means to the vertical sweep system for controlling the amplitude of the vertical deflection current to maintain said last mentioned ratio substantially constant within said selected range of beam intensity variations to thereby maintain a substantially constant aspect ratio.

14. In a television receiver having a cathode ray tube, horizontal and vertical deflection windings for deflecting an electron beam thereof to form a raster having a pair of opposing vertical sides with a tendency to be bent, a vertical sweep system for energizing the vertical deflection winding, a voltage supply, a semiconductor switch coupled in series with the horizontal deflection winding and the voltage supply and periodically rendered conductive to couple the voltage across the horizontal deflection winding to produce a horizontal deflection current proportional to the voltage to horizontally deflect the electron beam, a correction circuit for straightening the sides and including in combination; circuit means coupled to the vertical sweep system for providing a correction signal at the vertical sweep frequency, and means coupling the circuit means to the voltage supply for modulating the voltage with the correction signal to change the deflection current by amounts to straighten the sides of the raster.

15. The correction circuit of claim 14 wherein the means coupling the circuit means to the voltage supply comprises an amplifier device for increasing the amplitude of the correction signal.

16. The correction circuit of claim 14 wherein the vertical sides of the raster have a tendency to be parabolically bent inwardly, with the values of said circuit means being selected to provide a parabolic signal, whereby the amplitude of the deflection current is changed at a parabolic rate established by the vertical sweep frequency to straighten the vertical sides of the raster.

17. The correction circuit of claim 14 wherein the vertical sides of the raster have a tendency to be parabolically bent inwardly, the correction circuit including a series regulator semiconductor device having a pair of output electrodes for coupling a direct current voltage to the voltage supply, the values of the circuit means being selected to provide a parabolic signal, said semiconductor device having a control electrode coupled to said circuit means for varying the conduction of said device to cause the voltage from the voltage supply to vary at a parabolic rate determined by the vertical sweep frequency.

References Cited

UNITED STATES PATENTS

| | | | |
|---|---|---|---|
| 3,132,283 | 5/1964 | Jahns | 315—27 |
| 3,153,174 | 10/1964 | Claypool et al. | 315—27 |
| 3,359,453 | 12/1967 | Slavik | 315—27 |

RICHARD A. FARLEY, *Primary Examiner.*

J. G. BAXTER, *Assistant Examiner.*

U.S. Cl. X.R.

315—24